United States Patent [19]
Oehm

[11] 3,915,495
[45] Oct. 28, 1975

[54] PERSONAL SAFETY ARRANGEMENT WITH SAFETY BELT

[75] Inventor: Klaus Oehm, Wolfsburg, Germany

[73] Assignee: Volkswagenwerk Aktiengesellschaft, Wolfsburg, Germany

[22] Filed: May 31, 1974

[21] Appl. No.: 475,259

[30] Foreign Application Priority Data
June 14, 1973 Germany.............................. 2330210

[52] U.S. Cl............. 297/388; 280/150 SB; 297/385
[51] Int. Cl.²......................................... A62B 35/00
[58] Field of Search .......... 297/389, 388, 385, 387; 280/150 SB; 248/424, 429, 393

[56] References Cited
UNITED STATES PATENTS

| | | | |
|---|---|---|---|
| 2,825,581 | 3/1958 | Knight............................ | 280/150 SB |
| 2,880,788 | 4/1959 | Phillips et al.................. | 280/150 SB |
| 2,905,231 | 9/1959 | Olson............................. | 280/150 SB |
| 3,136,579 | 6/1964 | Hunter............................ | 297/385 X |
| 3,319,998 | 12/1965 | Boland........................... | 280/150 SB |
| 3,371,942 | 3/1968 | Buck et al....................... | 280/150 SB |
| 3,620,569 | 11/1971 | Mathis............................ | 297/389 X |
| 3,804,434 | 4/1974 | Lacey............................. | 297/385 X |

FOREIGN PATENTS OR APPLICATIONS
1,150,085   4/1969   United Kingdom................ 297/389

*Primary Examiner*—James T. McCall
*Attorney, Agent, or Firm*—Ernest F. Marmorek

[57] ABSTRACT

A safety arrangement for vehicles for retaining the person on a seat which is adjustable in the longitudinal direction of the vehicle including a safety belt having end portions secured to the vehicle frame on both sides of the seat, including a belt-guiding device fixedly secured to the side of the seat for guiding the belt to a lower securing point provided on a bottom portion of the vehicle frame.

3 Claims, 1 Drawing Figure

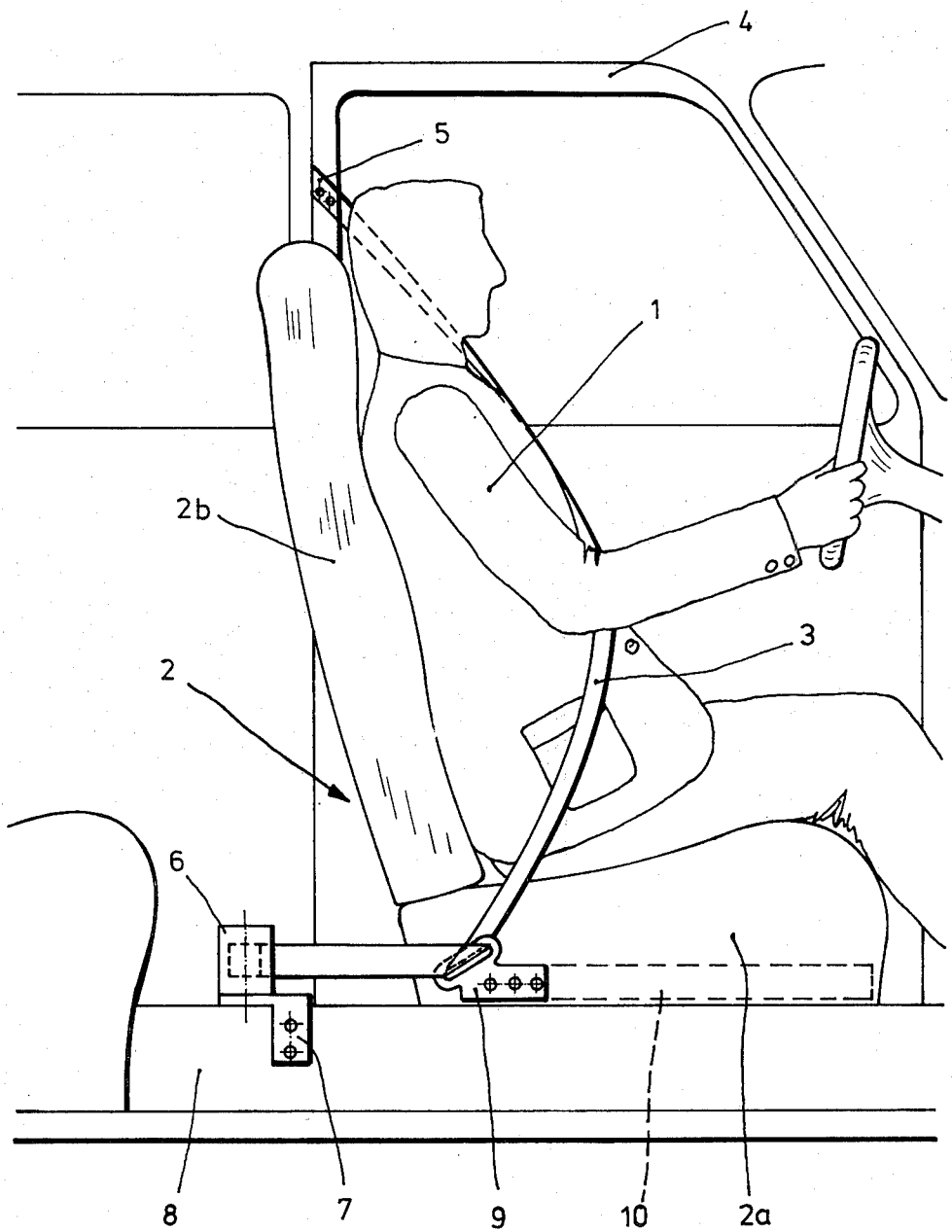

PERSONAL SAFETY ARRANGEMENT WITH SAFETY BELT

FIELD OF THE INVENTION

The present invention relates to a safety arrangement for vehicles, especially for motor vehicles, for retaining the passengers on a seat which is relatively adjustable with respect to the vehicle inside and having a safety belt associated with the seat, the ends of the safety belt being rigidly fixed to the vehicle frame on both side of the seat.

BACKGROUND OF THE INVENTION

As safety belt arrangements in motor vehicles presently mostly safety belts are used which became known as two point or three point belts the ends of which are secured to the vehicle frame on both sides of the associated seat. For example, a two point conventional belt usually is led from a lower securing point in the region of the vehicle frame middle diagonally over the body of the person in the form of a transverse shoulder belt to an upper securing point on the door frame placed at height approximately level with the shoulder of the person, or in the event of the so-called passive safety belts, such securing point is placed directly on the door which is adjacent to the seat in question. Inasmuch as only the front seats are usually adjustable in the longitudinal direction, in such known arrangements when the seat is adjusted forward or backward, the position of the safety belt on the body of the person also changes. Such disadvantageous change in the position of the safety belt usually becomes apparent in the belt portion which goes to the lower securing point which, with increasing adjustments of the seat forwardly, will attempt to glide upward on the body of the person from the bottom part. In addition in such safety belt arrangements which are provided with an automatic belt roll-up device approximately at the lower securing point located in the middle of the vehicle, difficulties will be experienced in connection with the perfect roll-up of the belt since the angle under which the belt is led into the roll-up device will change in dependence on the position of the seat.

There were in the past propositions made in connection with safety belts according to which at least a portion of the securing point of the belt was to be connected fixedly with the seat so that the position of the belt with respect to the seat, and hence with respect to the person sitting on the seat could not change even if the seat was adjusted. In the event, however, of a collapse of the seat back, that is, a fall backward, the forces acting on the safety belt are very large and therefore, the seat belt construction in order to accommodate such extremely large forces which otherwise it would not be able to withstand, had to be changed at high costs involving a complicated structure.

SUMMARY OF THE INVENTION

It is, therefore, an object of the present invention to provide a safety arrangement including the safety belt for vehicles, especially motor vehicles, which will not have the above-noted disadvantages of known or proposed safety belt arrangements and, at the same time, provides a reliable safety device which with respect to the seat and the person sitting on it remains a reliable and uniform retaining means and assures a guiding of the belt and permits a free adjustment of the seat without interference.

According to the present invention the end portion of the safety belt which is being led to the lower securing point is passed through a device securely fixed to the seat. Such device which preferably includes an attachment having an eyelet through it and which is secured to the seat at an appropriate position thereof assures a uniform guiding of the belt over the seat, that is, over the body of the person sitting on the seat, independently from the instantaneous position of the seat. In addition the provision of such attachment of the seat has the advantage that the securing point of the belt can be selected in wide limits with due consideration to the presence of the gear shift stick and brake or air outlets, and especially when the inside space of the vehicle is limited.

According to another feature of the present invention, when the safety arrangement is additionally provided with an automatic roll-up device for the belt in the middle portion of the vehicle, then the attachment can be placed on the seat at the side thereof which is facing the inside of the vehicle, that is, which is facing the middle of the vehicle, in a manner that the safety belt is guided around and being led substantially horizontally to the roll-up device which has a vertical rotating or take-up axis. As a result the guiding of the belt through the roll-up device becomes independent of the position of the seat so that the usual defects of the roll-up device stemming from the various angles of feeding the belt thereto, are reliably eliminated.

BRIEF DESCRIPTION OF THE DRAWING

The present invention will become more readily apparent from the following description of the preferred embodiment thereof shown, by way of example, in the accompanying drawing, which:

The single FIGURE illustrates in a schematic fashion a section of the inner space of a motor vehicle showing only the front seat which is provided with the safety arrangement accordingg to the present invention.

DESCRIPTION OF THE PREFERRED EMBODIMENT

With reference to the drawing it is seen that an operator of the vehicle identified by the reference numeral 1 is seated on the seat 2 and is buckled-up in the seated position by means of a safety belt 3.

The seat 2 is assumed to be adjustable in the longitudinal direction of the vehicle and has a bottom portion 2a as well as a back portion 2b which is adjustable with respect to the bottom portion. The safety belt 3 in the illustrated embodiment is shown as a passive two-point safety belt and runs starting from an upper securing point 5 placed on the door 4 adjacent the seat 2 and, runs further as a shoulder belt down from the shoulder of the person 1 transversely over his chest and down to the oppositely lying bottom portion. The lower end of the safety belt 3 is housed in a known spring-operated roll-up device 6 which has a vertically standing roll-up axle and which by means of a securing attachment 7 is secured to the housing of the drive shaft running in the middle of the vehicle and identified by 8. According to the present invention, at the side of the seat 3 facing the middle of the vehicle on an inner frame 10 of the seat portion 2a, an attachment having an eyelet 9 is fixedly secured which is to guide the belt 3. Such attachment 9 can be fixed to the frame 10 by means of screws or similar fixing means. Such attachment 9 having the eyelet will guide the safety belt in such a manner that it is led to the roll-up device 6 in a substantially horizontal direction.

The fixed securing of the attachment 9 on the seat 2 will have the consequence that independently from the position of the seat 2, which is adjustable as mentioned above longitudinally of the vehicle backward and forward, the safety belt 3 will have always the same retaining section effective on the person sitting on the seat. Also, under such conditions the securing latch or attachment 7 can be moved to a different position along the shaft housing 8 without having any effect on the available retaining section of the safety belt for the person 1. The latch 7 can be moved all the way to the remote end of the shaft housing 8. It is noted that such substantial advantages in the guiding and arranging of the safety belts 3 can be derived merely due to the additional provision of a very simple part which is in the form of the attachment 9 having the guide eyelet in it. Inasmuch as the attachment 9, according to the present invention provides only a guiding of the belt, in the event of a collapse of the back portion 2 rearwardly in case of a back fall or forwardly, the attachment 9 will be exposed only to forces which the frame end can withstand without any special frame reinforcement the angle between the insertion side and the outgoing side of the eyelet of the attachment 9 will be approximately 120°.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An occupant-restraining safety arrangement for a vehicle having a seat which is arrestably movable longitudinally of the vehicle, comprising
an automatic belt take-up device adapted to be fixedly mounted on the vehicle frame adjacent one side of said seat;
a restraining belt haing one end portion connected to said take-up device and another end portion secured to said vehicle frame adjacent the other side of said seat; and
a belt guide mounted on and movable with said seat at said one side thereof, said belt guide guiding the belt in a substantially horizontal direction towards said take-up device and preventing changes of that portion of said belt which extends from said belt guide to said other end portion, in its position relative to the body of an occupant during movements of said seat, due to the mounting of said belt guide on said seat and its movement with the same.

2. The safety arrangement as claimed in claim 1, wherein said roll-up device has a vertical rotating axle.

3. The safety arrangement as claimed in claim 1, wherein said guide comprises an eyelet directed at an exit angle of about 120° with respect to a frame of said seat, whereby a horizontal guiding of said belt is attained toward said device.

* * * * *